United States Patent [19]
Allen

[11] 4,255,013
[45] Mar. 10, 1981

[54] RIFLE SCOPE HAVING COMPENSATION FOR ELEVATION AND DRIFT

[75] Inventor: Ralph G. Allen, Floresville, Tex.

[73] Assignee: John E. McNair, Aurora, Colo.

[21] Appl. No.: 40,071

[22] Filed: May 17, 1979

[51] Int. Cl.³ .......................... G02B 7/10; G02B 27/32
[52] U.S. Cl. ....................................... 350/10; 350/44; 356/247; 33/247
[58] Field of Search ....................... 350/10, 42, 43, 44; 356/247

[56] References Cited

U.S. PATENT DOCUMENTS

| 2,155,389 | 4/1939 | Arden | 356/247 |
| 3,161,716 | 12/1964 | Burris et al. | 350/10 |
| 3,386,330 | 6/1968 | Burris et al. | 350/10 |
| 3,560,330 | 4/1970 | Allen | 350/10 |
| 3,749,494 | 7/1973 | Hodges | 350/10 |

FOREIGN PATENT DOCUMENTS 2259913  6/1973  Fed. Rep. of Germany ............. 350/10

*Primary Examiner*—Jon W. Henry
*Attorney, Agent, or Firm*—Gunn & Lee

[57] ABSTRACT

A variable power telescopic gunsight is shown with an automatic correction factor for elevation and/or drift. As the magnification is adjusted by a rotatable means on the gunsight which typically moves a pair of lens in response to camming action, a third longitudinal movement is provided in the gunsight in response to the rotation with appropriate camming surfaces to compensate for normal drop of the bullet by providing elevation of line of sight of the scope up or down. The same rotation action used to change the magnification can provide another longitudinal movement of another camming surface to compensate for drift by changing the line of sight of the scope to the right or left.

11 Claims, 5 Drawing Figures

RIFLE SCOPE HAVING COMPENSATION FOR ELEVATION AND DRIFT

FIELD OF THE INVENTION

The invention pertains to a variable power scope typically used with a rifle for optically measuring range and providing line of sight adjustments to compensate for drop and/or drift of the bullet. One adjustment of the scope, which will optically measure the range, will simultaneously provide the desired compensation due to drop. For even more accurate shooting, compensation can automatically be provided for drift. By using the present invention, after an initial firing in at a range the scope can be used for wide ranges of rifle/cartridge combinations and still correct for drop and drift.

DESCRIPTION OF THE PRIOR ART

Telescopic gunsights are a rather highly developed art. The early developments included telescopes incorporating posts and cross hairs to improve visability and assist in aiming at long range targets. In recent years, variable power scopes have been developed having a zoom lens to permit the user to vary the degree of magnification. Variable power scopes are widely used, and in recent developments, have incorporated stadia reticle (stadia marks) or varying scales to facilitate in measuring or estimating the range to the target. These variable scopes normally included a manual means for adjusting and compensating for range or drop of the bullet to the target. Some of these later developments have been patented, such as U.S. Pat. No. 3,161,716 to Burris; U.S. Pat. No. 3,386,330 to Burris; and U.S. Pat. No. 3,749,494 to Hodges. However, the closest related patent known to the applicant is applicant's own U.S. Pat. No. 3,506,330, which is hereby incorporated by reference.

The improvements incorporated in this invention, which distinguish over the prior art, primarily reside in those components which permit sighting on a target of relatively known dimensions in conjunction with varying the degree of magnification so that the stadia marks frame the known dimensions. By using the same motion that moves the lenses for the variable power adjustment of the target image within the stadia marks, the line of sight of the scope may be adjusted with respect to the gun to compensate for drop of the bullet to the target. Likewise, the same adjustment that moves the lenses may be used to automatically compensate for the drift of the bullet to the target by again adjusting the line of sight. Because the adjustments are automatic, once a target of known dimensions has been bracketed within the stadia marks, it is not necessary for the shooter to have knowledge of the estimated range to the target in order to automatically compensate for drop or drift of the bullet.

The present improved telescopic sight incorporates one or more members enclosed in the housing of the telescopic sight for providing longitudinal movement, which is generally parallel to the line of sight of the lens system. The longitudinal movement of the various embodiments may include a straight rigid construction, a rigid curved construction, or a flexible curved adjustable configuration. A cam, which provides the longitudinal movement of a member, is controlled by the rotatable member used to adjust the erecting lenses in the telescopic sight. The rotatable adjustment of the lenses either directly or through a special cam and cam follower, provides longitudinal movement of a contact point which adjusts the line of sight to compensate for bullet drop. Separate longitudinal movement must be included to compensate for bullet drift. The rotational movement, which displaces the lenses provides the variable magnification of the scope.

The improvement of this invention over the incorporated reference and the prior art resides in the cooperative function to provide a longitudinal motion which will bring about automatic horizontal and/or vertical adjustments in the line of sight of the scope simultaneously with the rotatable adjustment of the erecting lenses. This longitudinal motion makes possible a practical alternative to the prior art, including the incorporated reference, which can be fully contained within a linear compact telescopic sighting system. The present automatic sighting system is adaptable to a wide range of rifle/cartridge combinations. This invention also includes in one embodiment displacing the reference line of sight to the target by optical means, as well as employing mechanical means to displace the line of sight to compensate for bullet drift.

SUMMARY OF THE INVENTION

The present invention generally pertains to a variable power telescopic gunsight having optical means for establishing a line of sight and magnifying a shooter's view of a target by a variable adjusting means to change the degree of magnification. Changing the degree of magnification changes the size of the image of the target within the stadia marks for measuring the range to a target having known dimensions, said measurements being automatically converted to vary the line of sight to compensate for drop and drift.

The scope described in this invention has a linear housing which may be releasably secured to a gun, which housing encloses all moveable components except the rotatable adjustment for magnification. A lens tube is moveably mounted in the telescopic housing along with a rotatable coaxial cam means, such as an adjustment sleeve for positioning the lenses in the lens tube for variable magnification. The components described in this paragraph are generally old and well-known in the art.

The manner in which this scope either changes the line of sight within a compact linear scope housing to correct for drop and drift is the heart of the present invention. As can be more fully seen later, the present invention incorporates four species for automatically correcting for drop and drift. However, many other species are possible. Applicant's previous patent incorporated by reference accomplished related results by utilizing a radial cam tilting a lens tube to compensate for projectile drop over varying target ranges. The present invention utilizes a longitudinal movement created by the rotational adjustment of the erecting lenses, which longitudinal movement in cooperation with a longitudinally varying cam surface tilts the line of sight, thereby compensating for drop of the bullet. Also, the same principle can be used to automatically correct for drift of the bullet.

The first species of this invention utilizes a straight longitudinal member for providing the longitudinally varying cam surface to correct for the line of sight. The second species utilizes a curved longitudinal member to provide for the longitudinally varying cam surface to vary the line of sight to the target. The third species of the invention utilizes an adjustable flexible longitudinal member to provide a longitudinally variable cam surface to adjust the line of sight. The fourth species uses an optical means for tilting the line of sight through the lens system relative to the true line of sight to the target, thereby establishing an angular elevation necessary to compensate for drop of the bullet to the target. Various combinations of the species, as well as others, can be used to provide line of sight correction for either bullet drop or drift (or both), which adjustments are automatically provided by the same action to vary the magnitude of the variable power scope.

BRIEF DESCRIPTION OF THE DRAWINGS

Reference is made to the attached views wherein identical reference characters may be utilized to refer to identical or equivalent components throughout the various drawings and the following detailed descriptions.

DETAILED DESCRIPTION OF THE PREFERRED EMBODIMENT

Figure 1:
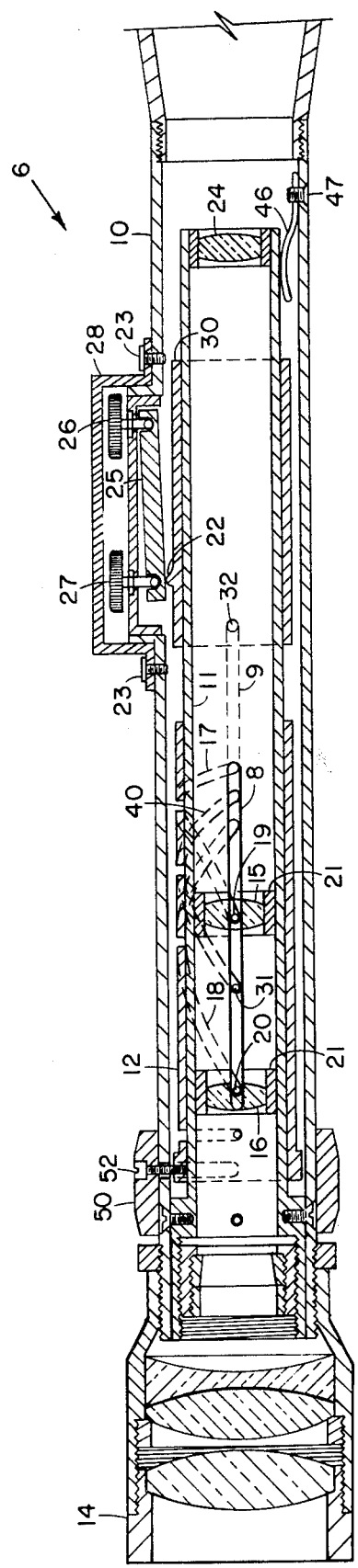
FIG. 1 is an elongated sectional view of the first species of this invention illustrating a straight rigid longitudinal member with a cooperative range function cam which provides line of sight changes.

Referring first to FIG. 1 of the drawings, the invention will be described in detail with like numerals being used to describe like components in subsequent species of the invention.

A variable power magnification scope represented generally by reference numeral 6 is shown in FIG. 1. The external configuration and appearance of the scope 6 will closely resemble the variable power scopes currently being marketed. The external surface will normally be of a tubular steel construction highly phosphorised or blued for appearance and durability. Housing 10 of the scope 6 is of an elongated tubular construction, which has the various components mounted therein or thereon. Lens tube 11 is contained within housing 10 and carries one or more moveably adjustable magnification lenses 15 and 16 (also known as "erecting lenses") therein. Rotatably mounted around the lens tube 11 is an adjustable sleeve 12 hereinafter referred to as the "control cylinder."

The scope 6 includes a relatively large coated objective lens 13 (not shown in FIG. 1) securely attached to a forward end of housing 10. At the opposite end (rear) of housing 10 of scope 6 is an adjustable attached eyepiece 14. As can be seen in FIG. 1, mounted inside of lens tube 11 are the magnification control lenses 15 and 16, which are adapted for slidable movement along the elongated axis of lens tube 11. Magnification control lenses 15 and 16 are secured in magnification control cam slots 17 and 18, respectively, by cam followers 19 and 20, respectively. The cam followers 19 and 20 for the lenses 15 and 16, respectively, are rigidly attached to lens mounting rings 21. Magnification control ring 50, which is mounted external to the housing 10, is connected by means of screw 52 through a slot (not shown) in housing 10 to control cylinder 12. Rotating the control cylinder 12 by means of the magnification control ring 50 will cause the cam followers 19 and 20 in magnification control slots 17 and 18, respectively, to adjust the lenses 15 and 16 in such a manner as to vary the power of magnification of the scope 6.

As illustrated in FIG. 1, mounted on the lens tube 11 is a sliding sleeve 30 which is a component of the first species of the present invention which includes a rigid flat linear cam member 25. The rigid flat linear cam member 25 may be adjusted by a forward elevation screw 26 and rear elevation screw 27 to permit changing the slope of the member thereby adapting the scope to different rifle/cartridge combinations and also facilitating sighting in of the scope 6 and rifle, which may be accomplished on the rifle range in a conventional manner. By adjusting the control cylinder 12 via the magnification control ring 50 located external to the housing 10, range cam follower 31 retained inside of cam control slot 8 and range function cam 40, or suitable alternate, is also adjusted. The range cam follower 31 is connected, external to the control cylinder 12, to a connecting rod 9 (partially shown in dotted lines) which also rigidly connects to sliding sleeve 30 by means of pin 32. Therefore, as the lenses 15 and 16 are adjusted by the turning of the magnification control ring 50, range cam follower 31 via range function cam 40, connecting rod 9, and pin 32 will also adjust sliding sleeve 30. The movement of sliding sleeve 30 will cause raised contact point 22 to move along rigid flat linear cam member 25 in a camming relationship therewith as maintained by spring 46 mounted inside of housing 10 by screw 47.

Once the range sighting in has been accomplished, the relationship between the variable power magnification lens system and range cam follower 31 will compensate for bullet drop over a variety of ranges. After sighting in has been accomplished, adjustable screw cover 28 is secured to housing 10 by screws 23 to prevent accidental changes once the scope 6 has been sighted in.

A collecting lens 24 generally used in variable power scopes is also shown included in the lens tube 11. It is noted that the sliding sleeve 30 may be located about the control cylinder 12, or an extension thereof, so as to slide over and around the control cylinder 12 rather than the lens tube 11.

Figure 2:
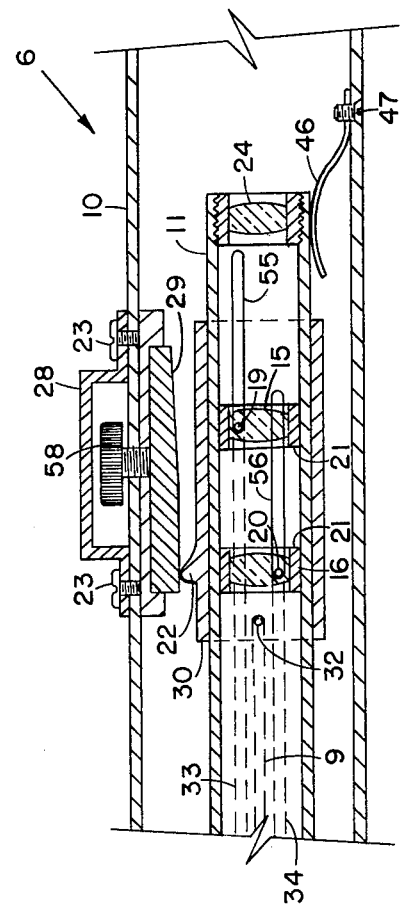
FIG. 2 is a fragmented sectional view of FIG. 1 wherein the straight rigid longitudinal member has been replaced with a curved rigid cam to form the second species of the invention.

Another species of the present invention is illustrated in FIG. 2, which is a partial sectional view of FIG. 1 illustrating the replacement of the rigid flat linear cam member 25 with a rigid curved longitudinal member 29. Movement of the magnification control lenses is again controlled by magnification control slots 17 and 18, respectively, by means of connecting rods 33 and 34, respectively (shown in reference lines). Movement of the connecting rods 33 and 34 will move magnification control lens 15 and 16, respectively, along slots 55 and 56.

Again, spring 46 holds the lens tube 11 upward so that raised contact point 22 will maintain a sliding cam relationship with rigid curved longitudinal member 29. The initial line of sight through the lens tube 11 is controlled by adjusting screw 58 and may be established at the rifle range by adjusting the vertical position of rigid curved longitudinal member 29 for a particular grouping of rifle/cartridge combinations. It should also be realized that the curved longitudinal member 29 could be replaced to give another selection of rifle/cartridge combinations. The adjustment of the sliding sleeve 30 is directly related to the rotation of the control cylinder 12 as varied by the magnification control ring 50 by external adjustment thereof. Such an adjustment of the sliding sleeve 30 to tilt the line of sight through the lens tube 11 compensates for drop of the bullet.

Figure 3:
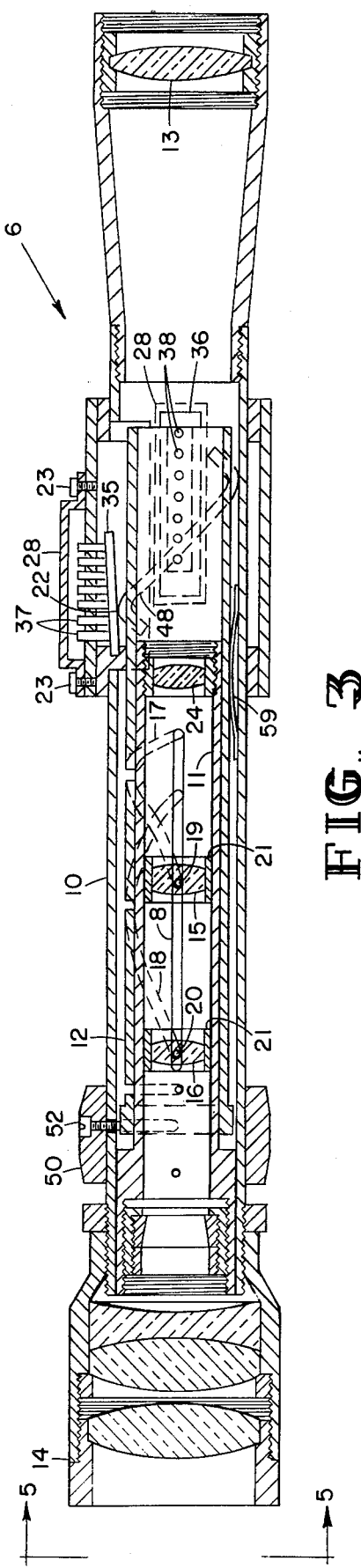
FIG. 3 is an elongated sectional view of the third species of the present invention illustrating the use of a flexible adjusting ranging cam to provide line of sight changes.

Referring now to FIG. 3 of the drawings, the third species of the present invention is shown. The magnification control lenses 15 and 16 are arranged at the left end of the lens tube 11 as previously described in conjunction with FIG. 1. In this species, rather than having a sliding sleeve 30 as described in conjunction with FIGS. 1 and 2, the third species shown in FIG. 3 has a spiral ridge range function cam 48 on the external surface of the magnification control cylinder 12. The spiral ridge range function cam 48 bears against a flexible longitudinal member 35 with camming contact being maintained by spring 59.

Likewise, a flexible longitudinal azimuth member 36 (shown in reference lines) is mounted on a horizontal plane with the axis of the scope 6, which flexible azimuth member 36 may compensate for drift of the bullet caused by bullet rotation as the spiral ridge range function cam 49 bears on the flexible member 36. Adjusting screws 37 may be used to vary the curve on the surface of flexible member 35 to accommodate various rifle/cartridge combinations to compensate for bullet drop. Likewise, the adjusting screws 38 may be used to vary the surface of the flexible azimuth control cam 36 to compensate for drift of the bullet caused by rotation for various rifle/cartridge combinations. Once a particular rifle/cartridge combination has been sighted in for both drop and drift, the adjustable screw covers 28 are replaced to prevent any accidental changes of the preset conditions for the rifle/cartridge combination.

An adjustment for a certain rifle/cartridge combination may also be used for other comparable rifle/cartridge combinations that have basically the same ballistic characteristics without additional sighting in being necessary. However for fine accuracy shooting, an additional sighting in may be desirable.

A spiral ridge range function cam 48 on the external surface of the magnification control cylinder 12 may replace range function cam 40, range cam follower 31, and sliding sleeve 30 in any of the previously described species.

Figure 4:
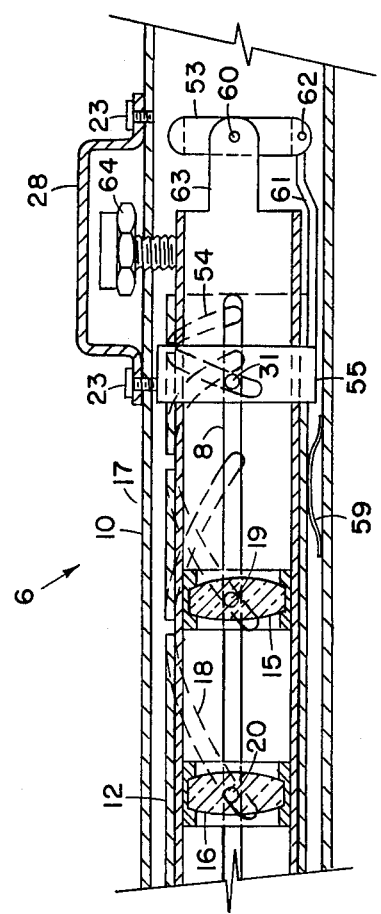
FIG. 4 is a fragmented sectional view of FIG. 3 illustrating changes in FIG. 3 to provide the fourth species of the present invention employing an optical shear plate in association with a ranging cam to optically deflect the line of sight to compensate for drop.

Referring now to FIG. 4 of the drawings, a fourth species of the invention is shown. In the fourth species, rather than tilting the lens tube 11 to adjust the line of sight for either drop of drift, an optical shear plate 53 in FIG. 4, or suitable prism, accomplishes the same result. A shear plate cam slot 54 is connected to the cam control slot 8 by means of range cam follower 31. Movement of range cam follower 31 along shear plate cam slot 54 (which has been exaggerated for the sake of clarity) will cause ring 55 to move therewith in a longitudinal manner. Movement of ring 55 in a longitudinal direction along the longitudinal axis of scope 6 will cause optical shear plate 53 to pivot about pivot pin 60 as a result of the connection with ring 55 by arm 61 through pin 62. Movement of the optical shear plate 53 about pivot pin 60 will cause a deflection of the line of sight in response to the motion of the magnification contol cylinder 12 and thus the magnification control lenses 15 and 16. The optical shear plate 53 is mounted by the pivot pin 60 on extending arms 63 of the lens tube 11.

Upon sighting in the scope 6 shown in FIG. 4, the initial position of the lens tube 11 may be set by adjusting screw 64 in the same manner as adjusting screw 58 of FIG. 2. By changing the shear plate cam slot 54, different groups of rifle/cartridge combinations can be provided with automatic compensation for bullet drop with the same basic telescopic sight. A fairly wide range of rifle/cartridge combinations can be accomodated without the necessity of changing shear plate cam slot 54.

Figure 5:
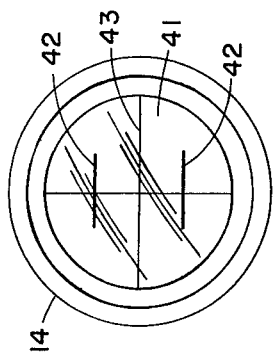
FIG. 5 is what appears to the observer upon looking into the scope shown in FIG. 3 by reference lines 5—5.

Referring now to FIG. 5, stadia marks 42 and cross hairs 43 are provided for range finding and aiming point reference, respectively. Upon a known size target filling the stadia marks 42, which represent a known dimension, by adjusting the magnification control ring 50, automatic adjustment has been provided for bullet (1) drop, and possibly (2) drift. Typically in a scope, the stadia marks would represent 18 inches, which normally corresponds to the vertical dimension of the body of a full grown Texas whitetail deer. Therefore, upon the body of the deer filling the stadia marks 42 by adjusting the magnification control ring 50, major trajectory dependent factors for a given rifle/cartridge combination have been provided with compensation.

The control ring 50 can have range gradations that indicate distance rather than the more conventional degree or power of magnification as is common in most variable power scopes presently sold.

Without showing a detail drawing, it would be possible to replace the flexible longitudinal member 35 of FIG. 3 with the rigid curved member 29 of FIG. 2. Either of these members may be replaced by the rigid flat linear cam member 25 by changing the spiral characteristics of the spiral ridge range function control cam 48 so that it corresponds to the shape of the range function cam 40 of FIG. 1.

In operation, the surface that controls the cam function that compensates for either drop or drift is shaped, either flat or curved, to cooperate with a linear or a nonlinear longitudinal motion, respectively, in response to rotation of the magnification control ring 50.

METHOD OF OPERATION

The magnification of the scope 6 is varied by rotating the magnification control ring 50 while aiming at a target. Rotation of the magnification control 50 also turns the control cylinder 12 within the housing 10. Rotation of the control cylinder 12 causes the magnification control lenses 15 and 16 to be moved along the cam control slot 8 in response to cam followers 19 and 20 following magnification control slots 17 and 18, respectively. Once the stadia marks 42, which represent a known target dimension, are filled by a target having the same known dimension, aiming has been completed with the gun attached thereto being ready for firing.

Simultaneously with the adjustment of the magnification of the scope 6, rotational motion of the control cylinder 12 is converted to longitudinal movement for nonlinear camming functions to compensate for range and/or drift. The conversion of the rotational movement of the control cylinder 12 to longitudinal movement for providing a camming function for compensation of drop is provided in FIGS. 1 and 2 by range function cam 40, in FIG. 3 by spiral ridge range function cam 48, and in FIG. 4 by sheer plate cam slot 54.

The variation, or deflection, in the line of sight is provided by the camming surfaces which may be constructed for particular groups of compatible rifle/cartridge combinations. Notably, the rigid flat camming surface 25 serves essentially all rifle/cartridge combinations. It should be realized in FIGS. 1-3 that the lens tube 11 is tilted whereas in FIG. 4 the line of sight is deflected by a shear plate 53, both of which accomplish the same result of compensating for drop for the particular rifle/cartridge combination.

I claim:

1. A variable magnification power rifle scope constructed along an axis comprising:
   a housing adapted to be attached to a gun;
   a lens tube movably mounted in said housing and having rotatable means to longitudinally position lens means in said tube for varying magnification;
   cam means operable by said rotatable means;
   said cam means providing non-linear longitudinal movement of a contact point against a cam surface for tilting line of sight in response to said rotatable means; and
   adjustable means for changing said tilt of said line of sight by adjusting said cam surface to adapt said scope to different rifle/cartridge combinations and to facilitate sighting in of said scope.

2. The invention of claim 1 wherein said cam surface comprises a rigid straight cam operable with said contact point.

3. The invention of claim 1 wherein said cam surface comprises a curved rigid cam operable with said contact point.

4. The invention of claim 1 wherein said cam surface comprises a flexible adjustable cam operable with said contact point, curve of said flexible adjustable cam being set by adjusting means.

5. The invention of claim 1 includes a shear plate or prism operable by said contact point to deflect said line of sight.

6. The invention of claim 1 wherein said cam means includes cam followers in slots of said lens tube and said rotatable means.

7. A variable magnification power rifle scope constructed along an axis comprising:
   a housing adapted to be attached to a gun;
   a lens tube movably mounted in said housing and having rotatable means to longitudinally position lens means in said tube for varying magnification;
   a raised spiral cam on said rotatable means and operable by said rotatable means;
   said raised spiral cam providing non-linear longitudinal movement of a contact point against the cam surface for tilting line of sight in response to said rotatable means; and
   adjustable means for changing said tilt of said line of sight by adjusting said cam surface to adapt said scope to different rifle/cartridge combinations and to facilitate sighting in of said scope.

8. The invention of claim 1, 2, 3, 4, 5, 6 or 7 further comprising a drift compensating means with a second contact point of second cam means responsive to said rotation for adjusting said line of sight an angular amount sufficient to compensate for drift.

9. The invention of claim 1, 2, 3, 4, 5, 6 or 7 further comprising a drift compensating means normal to said elevating means, said drift compensating means angularly displacing said line of sight an angular amount sufficient to compensate for drift of a projectile proportional to range.

10. The invention of claim 1 wherein said rotatable means is a magnification control ring with visual indications thereon to give range upon adjusting magnification to bracket an image of a target of known dimensions between reticle stadia marks.

11. A telescopic gun sight having optical means for establishing a line of fire and for magnifying a shooter's view of a target and moveable adjusting means for changing degree of magnification, reticle means in said line of sight for indicating the degree of magnification of said target, said target having a known dimensions whereby movement of said moveable adjusting means to establish a predetermined relation between said shooter's view of said target and said reticle means is indicative of range to said target, said telescopic gun sight comprising:
   a housing adapted to be attached to a gun;
   a lens tube mounted in said housing;
   said optical means including at least one optical element within and moveable along said lens tube;
   said moveable adjusting means comprising a sleeve rotatable with inset housing and first means responsive to said rotation of said sleeve for positioning said optical means along said lens tube, second means responsive to said rotation to non-linearly longitudinally position a contact point on a bearing surface adjustable fixed within said scope housing;
   elevating means tilting said line of sight in response to said non-linear longitudinal variation of said contact point to require a proper position of said gun with correct sight elevation upon aiming at said target for shooting;
   said elevating means comprising cam means for converting said non-linear longitudinal variation of said contact point to angular motion of elevation proportional to range and second optical means for deflecting said line of sight through said lens system, said deflecting means being responsive to said non-linear longitudinal positioning of said contact point to deflect the line of sight proportional to magnification thereby providing angular elevation required for range to target;
   drift compensating means with a second contact point of second cam means responsive to said rotation for adjusting said line of sight at angular amounts sufficient to compensate for drift.

* * * * *